(12) United States Patent
Kajiwara et al.

(10) Patent No.: US 11,251,454 B2
(45) Date of Patent: Feb. 15, 2022

(54) FUEL CELL

(71) Applicant: TOYOTA JIDOSHA KABUSHIKI KAISHA, Toyota (JP)

(72) Inventors: Takashi Kajiwara, Gotemba (JP); Kazunori Shibata, Mishima (JP); Sachio Okada, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 50 days.

(21) Appl. No.: 16/849,051

(22) Filed: Apr. 15, 2020

(65) Prior Publication Data
US 2020/0381759 A1  Dec. 3, 2020

(30) Foreign Application Priority Data

May 31, 2019 (JP) .............................. JP2019-103135

(51) Int. Cl.
| | | |
|---|---|---|
| *H01M 8/1004* | (2016.01) | |
| *H01M 4/88* | (2006.01) | |
| *H01M 8/026* | (2016.01) | |
| *H01M 8/0273* | (2016.01) | |

(52) U.S. Cl.
CPC ....... *H01M 8/1004* (2013.01); *H01M 4/8807* (2013.01); *H01M 8/026* (2013.01); *H01M 8/0273* (2013.01)

(58) Field of Classification Search
CPC ... H01M 8/1004; H01M 4/8807; H01M 8/026
See application file for complete search history.

(56) References Cited

U.S. PATENT DOCUMENTS

| 9,240,598 | B2 | 1/2016 | Martin et al. |
| 2007/0231619 | A1 | 10/2007 | Strobel et al. |
| 2009/0197147 | A1 | 8/2009 | Fly et al. |
| 2011/0318665 | A1* | 12/2011 | Yamamoto .......... H01M 8/0273 429/469 |
| 2018/0226663 | A1 | 8/2018 | Ishida et al. |
| 2018/0342741 | A1 | 11/2018 | Sakano et al. |

FOREIGN PATENT DOCUMENTS

JP  2018-129174  8/2018

* cited by examiner

*Primary Examiner* — Olatunji A Godo
(74) *Attorney, Agent, or Firm* — Finnegan, Henderson, Farabow, Garrett & Dunner, LLP

(57) ABSTRACT

A fuel cell includes: a membrane electrode gas diffusion layer assembly in which a membrane electrode assembly is sandwiched by a pair of gas diffusion layers; an insulating member formed into a frame shape, and being in contact with an outer peripheral portion of the membrane electrode gas diffusion layer assembly; and first and second separators sandwiching the membrane electrode gas diffusion layer assembly and the insulating member.

17 Claims, 7 Drawing Sheets

FUEL CELL

CROSS-REFERENCE TO RELATED APPLICATION

This application is based upon and claims the benefit of priority of the prior Japanese Patent Application No. 2019-103135, filed on May 31, 2019, the entire contents of which are incorporated herein by reference.

TECHNICAL FIELD

The present disclosure relates to a fuel cell.

BACKGROUND

A fuel cell includes a membrane electrode gas diffusion layer assembly in which a membrane electrode assembly is sandwiched by a pair of gas diffusion layers. Reactant gas reaches the membrane electrode assembly, and power generation reaction occurs (See Japanese Unexamined Patent Application Publication No. 2018-129174).

However, if a flow rate of the reactant gas passing around the membrane electrode gas diffusion layer assembly and does not reach the membrane electrode assembly is large, the power generation efficiency might be reduced.

SUMMARY

It is an object of the present disclosure to provide a fuel cell that has improved power generation efficiency.

The above object is achieved by a fuel cell including: a membrane electrode gas diffusion layer assembly in which a membrane electrode assembly is sandwiched by a pair of gas diffusion layers; an insulating member formed into a frame shape, and being in contact with an outer peripheral portion of the membrane electrode gas diffusion layer assembly; and first and second separators sandwiching the membrane electrode gas diffusion layer assembly and the insulating member, wherein the insulating member includes: a base member formed into a frame shape; and a first elastic portion provided beforehand on a first surface of the base member facing the first separator, an elastic modulus of the first elastic portion being smaller than an elastic modulus of the base member, the first separator includes: first groove portions arranged side by side in a first direction, first reactant gas flowing along the first groove portions; a first outer groove portion located in the first direction from the first groove portions, the first reactant gas flowing along the first outer groove portion; a first bead portion adjacent to the first outer groove portion and located in the first direction from the first outer groove portion, the second separator includes a second bead portion, the insulating member being sandwiched between the first and second bead portions, the first elastic portion includes: a first compressed region compressed by the first bead portion between the first and second bead portions; and a first non-compressed region located in the first outer groove portion.

The first non-compressed region of the first elastic portion is located in the first outer groove portion, which reduces a cross-sectional area of a flow path defined by the first outer groove portion. This reduces a ratio of a flow rate of the first reactant gas flowing along the first outer groove portion to a total flow rate of the first reactant gas flowing along the first groove portions and the first outer groove portion. Accordingly, the flow rate of the first reactant gas flowing along the first groove portions other than the first outer groove portion is ensured, thereby ensuring the flow rate of the first reactant gas to achieve the membrane electrode assembly and to be used for the power generation reaction. This improves the power generation efficiency.

The first non-compressed region may be thicker than the first compressed region in a state where the membrane electrode gas diffusion layer assembly and the insulating member are sandwiched between the first and second separators.

The first non-compressed region may be equal to the first compressed region in thickness, before the membrane electrode gas diffusion layer assembly and the insulating member are sandwiched between the first and second separators.

The first non-compressed region may be thicker than the first compressed region, before the membrane electrode gas diffusion layer assembly and the insulating member are sandwiched between the first and second separators.

The first elastic portion may be entirely formed on the first surface of the base member.

The first non-compressed region may be thicker than the base member.

A material of the first elastic portion may include at least one of a rubber and a thermoplastic elastomer.

The insulating member may include a second elastic portion provided beforehand on a second surface, opposite to the first surface, of the base member, an elastic modulus of the second elastic portion being smaller than an elastic modulus of the base member, the second separator may include: second groove portions arranged side by side in the first direction, second reactant gas flowing along the second groove portions; a second outer groove portion located in the first direction from the second groove portions, and adjacent to the second bead portion and located in a direction opposite to the first direction, the second reactant gas flowing along the second outer groove portion; the second elastic portion may include: a second compressed region compressed by the second bead portion between the first and second bead portions; and a second non-compressed region located in the second outer groove portion.

The second non-compressed region may be thicker than the second compressed region in a state where the membrane electrode gas diffusion layer assembly and the insulating member are sandwiched between the first and second separators.

The second non-compressed region may be equal to the second compressed region in thickness, before the membrane electrode gas diffusion layer assembly and the insulating member are sandwiched between the first and second separators.

The second non-compressed region may be thicker than the second compressed region, before the membrane electrode gas diffusion layer assembly and the insulating member are sandwiched between the first and second separators.

The second non-compressed region may be thicker than the base member.

The second elastic portion may be entirely formed on the second surface of the base member.

A material of the second elastic portion may include at least one of a rubber and a thermoplastic elastomer.

The membrane electrode assembly may include: an electrolyte membrane; a first catalyst layer formed on a first surface of the electrolyte membrane in the first separator side; and a second catalyst layer formed on a second surface opposite to the first surface of the electrolyte membrane so as to expose an edge region of the second surface of the electrolyte membrane, the pair of gas diffusion layers may include: a first gas diffusion layer joined to the first catalyst layer; and a second gas diffusion layer joined to the second catalyst layer so as to expose the edge region, the first separator may include a first rib portion adjacent to the first outer groove portion, located in a direction opposite to the first direction from the first outer groove portion, and in contact with the first gas diffusion layer, and the second separator may include a second rib portion sandwiching the insulating member, the edge region of the electrolyte membrane, the first catalyst layer, and the first gas diffusion layer with the first rib portion.

The first elastic portion may be in contact with the edge region, and may not be joined to the edge region.

At least a part of the first rib portion may be in contact with the first gas diffusion layer, and may sandwich the membrane electrode assembly and the pair of gas diffusion layers with the second rib portion.

DETAILED DESCRIPTION

[Schematic Configuration of Fuel Cell Stack]

Figure 1:
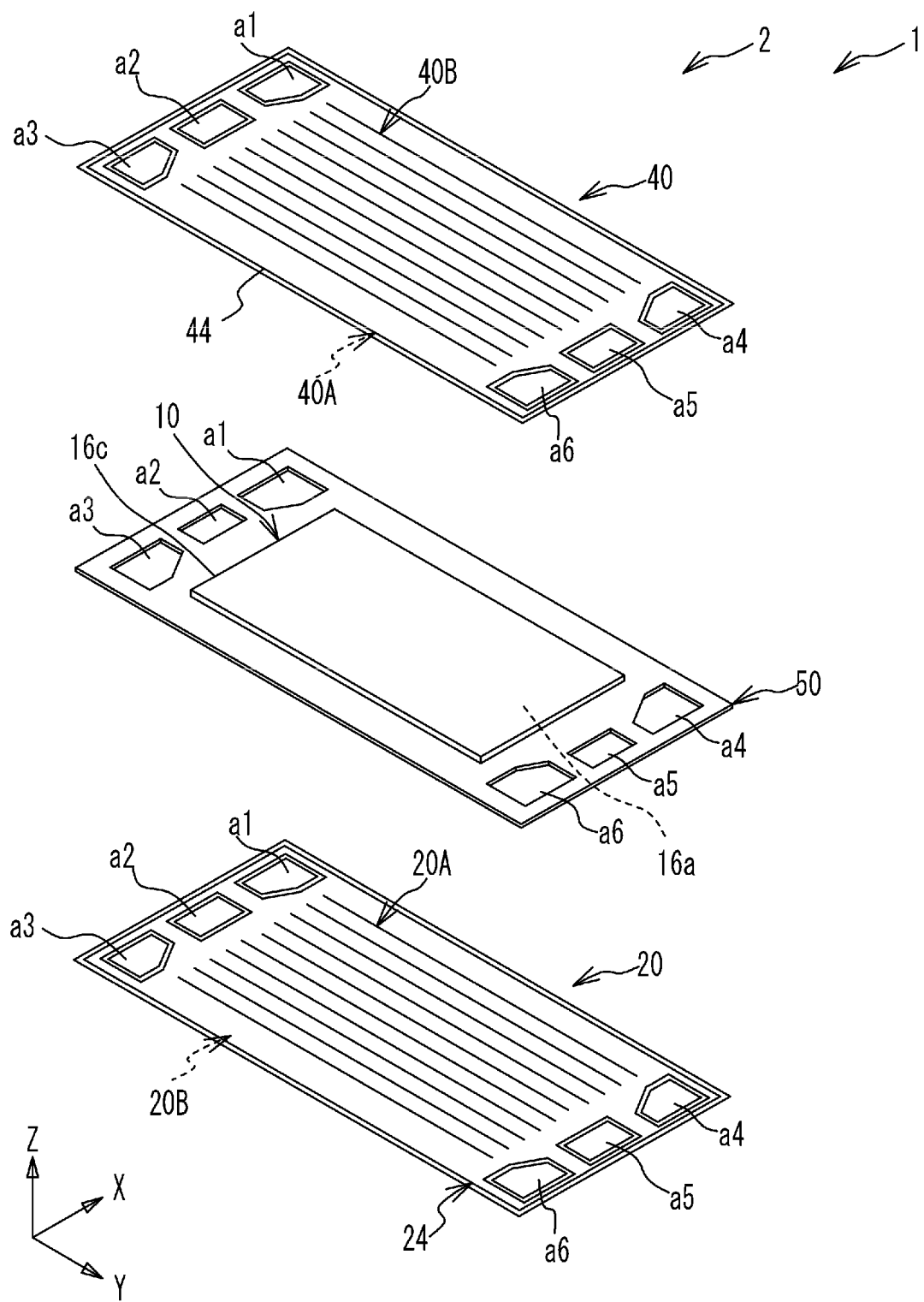
FIG. 1 is an exploded perspective view of a unit cell of a fuel cell.

FIG. 1 is an exploded perspective view of a unit cell 2 of a fuel cell stack 1. The fuel cell stack 1 is configured by stacking the unit cells 2. FIG. 1 illustrates only one unit cell 2, and omits other unit cells. FIG. 1 illustrates an X direction, a Y direction, and a Z direction that are orthogonal to one another. The X direction and the Y direction respectively correspond to a short direction and a longitudinal direction of the unit cell 2 having a substantially rectangular shape. The Z direction corresponds to a direction in which the unit cells 2 are stacked.

The fuel cell stack 1 is a polymer electrolyte fuel cell that generates electric power with an anode gas (for example, hydrogen) and a cathode gas (for example, oxygen) as reactant gases. The unit cell 2 includes: a membrane electrode gas diffusion layer assembly (hereinafter referred to as MEGA) 10; a frame 50 having a frame shape; an anode separator 20 and a cathode separator 40 (hereinafter referred to as separators). The separator 20, facing the MEGA 10 and the frame 50, is located in −Z direction therefrom. The separator 40, facing the MEGA 10 and the frame 50, is located in +Z direction therefrom. The MEGA 10 includes an anode gas diffusion layer 16a and a cathode gas diffusion layer 16c (hereinafter referred to as diffusion layers). The frame 50 is an example of an insulating member. The separators 20 and 40 are an example of first and second separators.

In the separators 20 and 40 and the frame 50, holes a1 to a6 are formed to penetrate therethrough. The holes a1 to a3 are formed along one side of two short sides of the separators 20 and 40 and the frame 50, and the holes a4 to a6 are formed along the other side thereof. The hole a1 defines a cathode inlet manifold. The hole a2 defines a coolant inlet manifold. The hole a3 defines an anode outlet manifold. The hole a4 defines an anode inlet manifold. The hole a5 defines a coolant outlet manifold. The hole a6 defines a cathode outlet manifold.

A surface of the separator 20 facing the MEGA 10 is formed with an anode flow path portion 20A (hereinafter referred to as flow path portion) which communicates the anode inlet manifold with the anode outlet manifold and along which the anode gas flows. The other surface opposite to the surface of the separator 20 facing the MEGA 10 is formed with a coolant flow path portion 20B (hereinafter referred to as flow path portion) which communicates the coolant inlet manifold with the coolant outlet manifold and along which the coolant flows. A surface of the separator 40 facing the MEGA 10 is formed with a cathode flow path portion 40A (hereinafter referred to as flow path portion) which communicates the cathode inlet manifold with the cathode outlet manifold and along which the cathode gas flows. The other surface opposite to the surface of the separator 40 facing the MEGA 10 is formed with a coolant flow path portion 40B (hereinafter referred to as flow path portion) which communicates the coolant inlet manifold with the coolant outlet manifold and along which the coolant flows. The flow path portions 20A and 20B include grooves extending in the Y direction as the longitudinal direction of the separator 20 and arranged in the X direction. The same arrangement is applied to the flow path portions 40A and 40B.

The grooves of the flow path portion 20A are recessed away from the MEGA 10. Likewise, the grooves of the flow path portion 40A are recessed away from the MEGA 10. The flow path portion 20B is integrally formed with the flow path portion 20A. The flow path portion 40B is integrally formed with the flow path portion 40A. The separators 20 and 40 are made of a material having a gas blocking property and electrical conductivity, and are thin plate shaped members formed by pressing stainless steel, metal such as titanium or titanium alloy.

Bead portions 24 and 44 are formed along the outer peripheries of the separators 20 and 40, respectively. The bead portion 24 is formed so as to surround the flow path portions 20A and 20B and the holes a1 to a6. Likewise, the bead portion 44 is formed so as to surround the flow path portions 40A and 40B and the holes a1 to a6. The bead portions 24 and 44 sandwich the frame 50 to prevent leakage of the anode gas and the cathode gas, as will be described later in detail. The bead portions 24 and 44 are examples of first and second bead portions.

Figure 2:
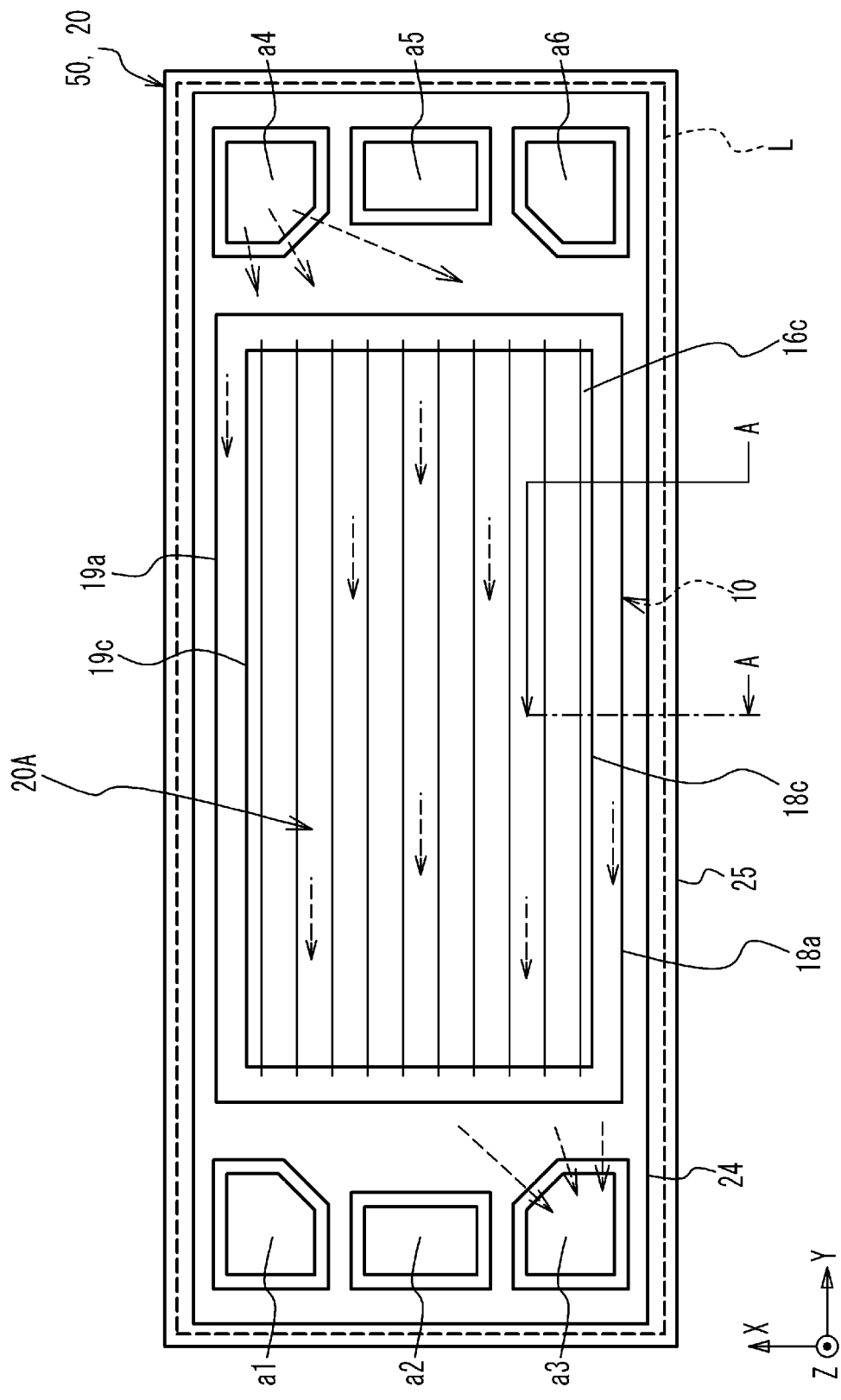
FIG. 2 is a perspective view illustrating a frame, a MEGA, and a separator, when viewed in the −Z direction.

FIG. 2 is a perspective view illustrating the frame 50, the MEGA 10, and the separator 20, when viewed in the −Z direction. The anode gas flows from the hole a4 through the flow path portion 20A in the −Y direction, and is discharged to the hole a3. When viewed from the above, each of the diffusion layers 16a and 16c has a rectangular shape, but the diffusion layer 16a is formed larger, in the XY plane direction, than the diffusion layer 16c. FIG. 2 illustrates edges 18c and 19c of the diffusion layer 16c and edges 18a and 19a of the diffusion layer 16a. The edges 18c and 19c are parallel to each other in the Y direction, and face each other in the X direction. The edges 18a and 19a are parallel to each other in the Y direction, and face each other in the X direction. Since the diffusion layer 16a is larger, in the XY plane direction, than the diffusion layer 16c, the edge 18a is located outside the edge 18c, and the edge 19a is also located outside the edge 19c. The edges 18a and 19a are substantially parallel to each other in the direction in which the groove portions of the flow path portion 20A extend. The edges 18c and 19c are substantially parallel to each other in the direction in which the groove portions of the flow path portion 40A extend.

FIG. 2 illustrates a welding line L for welding the separator 20 and a separator adjacent to the separator 20. The welding line L extends between the bead portion 24 and the outer peripheral edge of the separator 20. Although not illustrated in FIG. 2, a welding line is designed so as to surround each of the holes a1, a3, a4, and a6.

Figure 3:
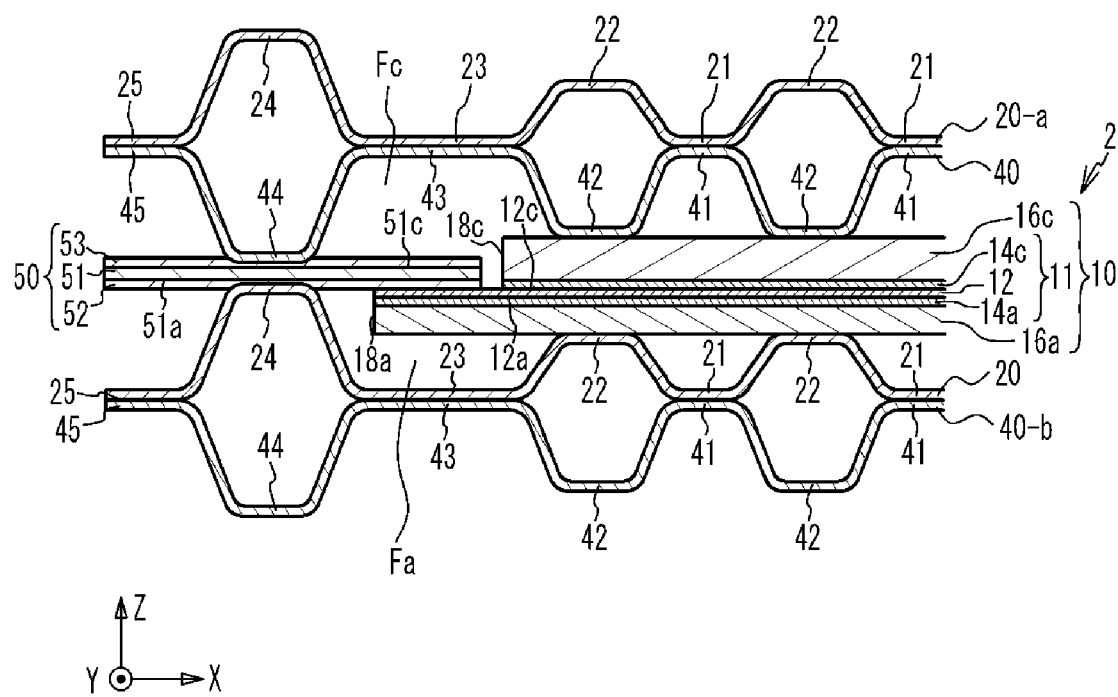
FIG. 3 is a cross-sectional view of the unit cell corresponding to a line A-A illustrated in FIG. 2.

FIG. 3 is a cross-sectional view of the unit cell 2 corresponding to a line A-A illustrated in FIG. 2. FIG. 3 illustrates a separator 20-a, at the anode side, of another unit cell stacked on the unit cell 2 and located in the +Z direction from the unit cell 2. Further, FIG. 3 illustrates a separator 40-b, at the cathode side, of another unit cell stacked on the unit cell 2 and located in the -Z direction from the unit cell 2. The separators 20 and 40-b are welded to each other along the welding line L described above. Likewise, the separators 40 and 20-a are welded to each other. Although the separator 20-a is the same as the separator 20 and the separator 40-b is the same as the separator 40, they are denoted by different reference numerals for convenience of explanation. Additionally, FIG. 3 illustrates the edges 18a and 18c of the diffusion layers 16a and 16c, but does not illustrates the edges 19a and 19c. The edges 19a and 19c are symmetric to the edges 18a and 18c with respect to the YZ plane, respectively.

The MEGA 10 includes the diffusion layers 16a and 16c, and a membrane electrode assembly (hereinafter referred to as MEA) 11. The MEA 11 includes an electrolyte membrane 12, and an anode catalyst layer 14a and a cathode catalyst layer 14c (hereinafter referred to as catalyst layers). The catalyst layer 14a is formed on a surface 12a, at the separator 20 side, of the electrolyte membrane 12. The catalyst layer 14c is formed on a surface 12c, opposite to the surface 12a, of the electrolyte membrane 12. The electrolyte membrane 12 is a solid polymer thin film, such as a fluorine-based ion exchange membrane, with high proton conductivity in a wet state. The catalyst layers 14a and 14c are made by coating a catalyst ink containing a carbon carrier supporting platinum (Pt) or the like and an ionomer having proton conductivity on the electrolyte membrane 12. The diffusion layers 16a and 16c are made of a material having gas permeability and conductivity, for example, a porous fiber base material such as carbon fiber or graphite fiber. The diffusion layers 16a and 16c are joined to the catalyst layers 14a and 14c, respectively.

The catalyst layer 14a is formed substantially entirely on the surface 12a of the electrolyte membrane 12. The catalyst layer 14c is formed at the center of the surface 12c of the electrolyte membrane 12, but not at the peripheral region of the electrolyte membrane 12. The diffusion layer 16a is located such that an end portion thereof is substantially aligned with an end portion of the catalyst layer 14a. The diffusion layer 16c is located such that an end portion thereof is substantially aligned with an end portion of the catalyst layer 14c or that the end portion of the diffusion layer 16c is located slightly inside of the end portion of the catalyst layer 14c. Thus, the peripheral region of the electrolyte membrane 12 is exposed. The inner peripheral portion of the frame 50 is bonded to the exposed peripheral region of the electrolyte membrane 12.

[Configuration of Separator 20]

The separator 20 of the unit cell 2 will be described. The flow path portion 20A of the separator 20 illustrated in FIGS. 1 and 2 includes groove portions 21 and an outer groove portion 23 extending in the Y direction as illustrated in FIG. 3. The groove portions 21 are arranged side by side in the -X direction. The groove portion 21 faces the diffusion layer 16a and is recessed away therefrom in the -Z direction. A rib portion 22 extending in the Y direction is provided between the two adjacent groove portions 21. The rib portion 22 protrudes in the +Z direction in contact with the diffusion layer 16a. The groove portion 21 and the rib portion 22 adjacent to each other share a side wall portion.

The outer groove portion 23 is located in the -X direction from the groove portions 21. The outer groove portion 23 spans the diffusion layer 16a and the frame 50, and is recessed in the -Z direction from the diffusion layer 16a and the frame 50. The outer groove portion 23 is located at the outermost side located in the -X direction among the groove portions constituting the flow path portion 20A through which the anode gas flows. The outer groove portion 23 and the rib portion 22 adjacent to each other share a side wall.

A bead portion 24 is adjacent to the outer groove portion 23 and is located in the -X direction therefrom, and extends along the outer groove portion 23. The bead portion 24 protrudes in the +Z direction so as to sandwich the frame 50 with the bead portion 44 of the separator 40. A protrusion amount of the bead portion 24 in the +Z direction is larger than that of the rib portion 22 in the +Z direction. The bead portion 24 and the outer groove portion 23 adjacent to each other share a side wall portion. An edge portion 25 is adjacent to the bead portion 24 and is located in the -X direction therefrom, and is recessed in the -Z direction away from the frame 50.

The anode gas flows through the groove portions 21 and the outer groove portion 23 in the -Y direction, that is, from the front side to the back side in FIG. 3. The anode gas partially flowing in the -Y direction in the groove portion 21 enters the diffusion layer 16a, diffuses in the +X direction and the -X direction in the diffusion layer 16a, and reaches the catalyst layer 14a. When the anode gas reaches the catalyst layer 14a, the oxidation reaction of hydrogen of the anode gas is promoted. Herein, the edge 18a of the diffusion layer 16a is located in the outer groove portion 23. Therefore, the anode gas partially flowing in the outer groove portion 23 flows between, for example, the edge 18a of the diffusion layer 16a, and the common side wall portion of the outer groove portion 23 and the bead portion 24 facing the edge 18a, and then passes through the MEGA 10 without reaching the catalyst layer 14a. As illustrated in FIG. 3, a flow path space Fa is surrounded by the outer groove portion 23, the frame 50, the diffusion layer 16a, the outer edge of the catalyst layer 14a, and the outer edge of the electrolyte membrane 12.

[Configuration of Separator 40]

The separator 40 of the unit cell 2 will be described. The flow path portion 40A of the separator 40 illustrated in FIG. 1 includes groove portions 41 and an outer groove portion 43 extending in the Y direction as illustrated in FIG. 3. The groove portions 41 are arranged side by side in the -X direction. The groove portion 41 is recessed in the +Z direction away from the diffusion layer 16c. A rib portion 42 extending in the Y direction is provided between the two adjacent groove portions 41. The rib portion 42 protrudes in the −Z direction in contact with the diffusion layer 16c. The groove portions 41 and the rib portions 42 adjacent to each other share a side wall portion.

The outer groove portion 43 is located in the −X direction from the groove portions 41. The outer groove portion 43 spans the diffusion layer 16c and the frame 50, and is recessed in the +Z direction away from the diffusion layer 16c and the frame 50. The outer groove portion 43 is located at the outermost side in the −X direction among the groove portions constituting the flow path portion 40A through which the cathode gas flows. The outer groove portion 43 and the rib portion 42 adjacent to each other share a side wall portion.

The bead portion 44 is adjacent to the outer groove portion 43 and is located in the −X direction therefrom, and extends along the outer groove portion 43. The bead portion 44 protrudes in the −Z direction so as to sandwich the frame 50 with the bead portion 24 of the separator 20. A protrusion amount of the bead portion 44 in the −Z direction is larger than that of the rib portion 42 in the −Z direction. The bead portion 44 and the outer groove portion 43 adjacent to each other share a side wall portion. An edge portion 45 is adjacent to the bead portion 44 and is located in the −X direction therefrom, and is recessed in the +Z direction away from the frame 50.

The cathode gas flows through the groove portions 41 and the outer groove portion 43 in the +Y direction, that is, from the back side to the front side in FIG. 3. Like the anode gas, the cathode gas partially flowing in the +Y direction in the groove portions 41 enters the diffusion layer 16c, diffuses in the +X direction and the −X direction in the diffusion layer 16c, and reaches the catalyst layer 14c. When the cathode gas reaches the catalyst layer 14c, the reduction reaction of oxygen of the cathode gas is promoted. Herein, the edge 18c of the diffusion layer 16c is located in the outer groove portion 43. Therefore, the cathode gas partially flowing in the outer groove portion 43 flows, for example, between the edge 18c of the diffusion layer 16c, and the common side wall portion of the outer groove portion 43 and the bead portion 44 facing the edge 18c, and passes the MEGA 10 without reaching the catalyst layer 14c. A flow path space Fc is surrounded by the outer groove portion 43, the frame 50, the diffusion layer 16c, the catalyst layer 14c, and the outer edge of the electrolyte membrane 12.

The groove portion 21, the outer groove portion 23, and the edge portion 25 of the separator 20 are in contact with the groove portion 41, the outer groove portion 43, and the edge portion 45 of the separator 40-b, respectively. The rib portion 22 and the bead portion 24 of the separator 20 respectively face the rib portion 42 and the bead portion 44 of the separator 40-b and are located in the Z direction therefrom. Cooling water flows in a space surrounded by the rib portion 22 of the separator 20 and the rib portion 42 of the separator 40-b. The cooling water and the reactant gas does not flow in a space surrounded by the bead portion 24 of the separator 20 and the bead portion 44 of the separator 40-b. The edge portion 25 of the separator 20 and the edge portion 45 of the separator 40-b are welded to each other along the above-described welding line L. The groove portion 41, the outer groove portion 43, and the edge portion 45 of the separator 40 are in contact with the groove portion 21, the outer groove portion 23, and the edge portion 25 of the separator 20-a, respectively. The rib portion 42 and the bead portion 44 of the separator 40 respectively face the rib portion 22 and the bead portion 24 of the separator 20-a, and are located in the Z direction therefrom. The cooling water flows in a space surrounded by the rib portion 42 of the separator 40 and the rib portion 22 of the separator 20-a. The cooling water and the reactant gas does not flow in a space surrounded by the bead portion 44 of the separator 40 and the bead portion 24 of the separator 20-a. The edge portion 25 of the separator 20-a and the edge portion 45 of the separator 40 are welded to each other along the above-described welding line L. The welding of the separators 20 and 40-b and the welding of the separators 40 and 20-a are performed beforehand, before the unit cells 2 are stacked as the fuel cell stack 1. The separators 20 and 40-b are jointed to each other by, not limited to, welding, and the separators 40 and 20-a are jointed to each other by, not limited to, welding. They may be joined by adhering.

[Configuration of Frame 50]

The frame 50 includes a base member 51 and elastic portions 52 and 53. The base member 51 is a thin sheet having a substantially uniform thickness and is made of a synthetic resin. For example, the synthetic resin is any one of polyethylene terephthalate (PET), polybutylene naphthalate (PBN), polyphenylene sulfide (PPS), polyetherimide (PEI), polyethylene succinate (PES), polyphenylene sulfone (PPSU), polysulfone (PSU), polypropylene (PP), ultra high molecular weight polyethylene (UHPE), syndiotactic polystyrene (SPS), cycloolefin copolymer (COC). The elastic portions 52 and 53 are formed into a thin sheet shape, and have elasticity. Specifically, each material of the elastic portions 52 and 53 includes at least one of rubber and thermoplastic elastomer resin, and may be, for example, foamed rubber, unfoamed rubber, or a mixture of rubber and thermoplastic elastomer resin. The elastic portions 52 and 53 have the same shape, size, and material, but are denoted by different reference numerals for convenience of explanation. The elastic portion 52 is provided beforehand on a surface 51a, at the separator 20 side, of the base member 51. The elastic portion 53 is provided beforehand on a surface 51c, opposite to the surface 51a, of the base member 51. Each elastic modulus of the elastic portions 52 and 53 is smaller than that of the base member 51. Each of the elastic portions 52 and 53 is more easily elastically deformed than the base member 51. The elastic portions 52 and 53 do not contain a bonding component, but may contain an adhesive component. The elastic portion 52 of the frame 50 is joined to the peripheral region of the electrolyte membrane 12. The elastic portions 52 and 53 are examples of first and second elastic portions.

Figure 4A:
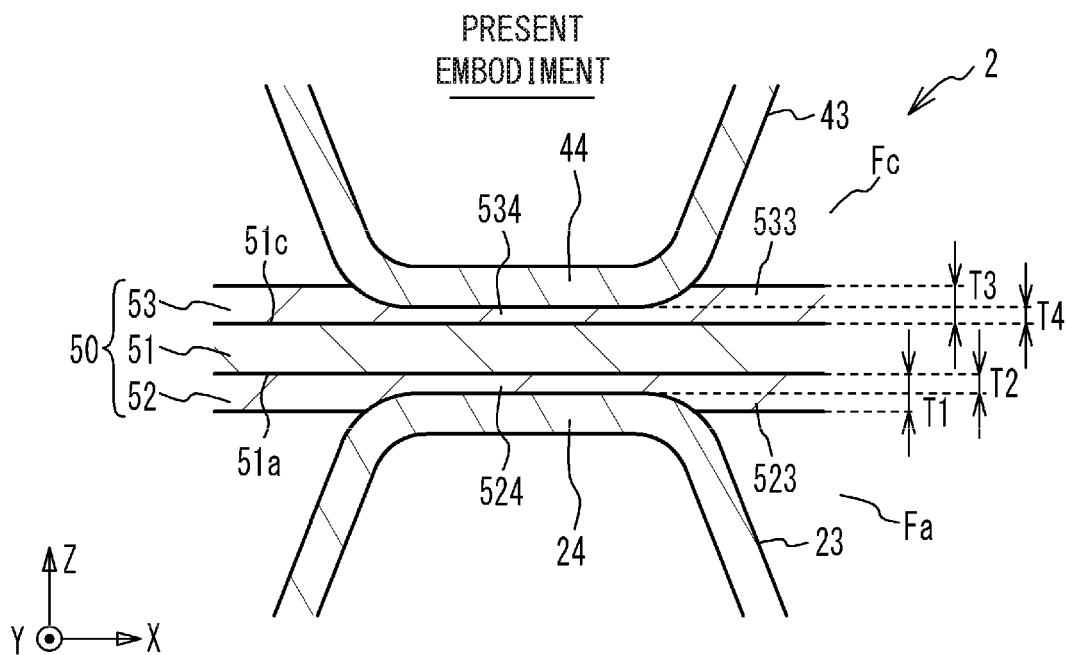
FIG. 4A is a partially enlarged view of FIG. 3.

FIG. 4A is a partially enlarged view of FIG. 3. The elastic portion 52 includes a non-compressed region 523 and a compressed region 524. The compressed region 524 is compressed in the +Z direction and is elastically deformed by the bead portion 24. The elastic restoring force of the compressed region 524 exerting between the compressed region 524 and the bead portion 24 ensures sealability between the frame 50 and the bead portion 24, which prevents the anode gas from leaking from the outer groove portion 23 to the outside. The non-compressed region 523 is located in the +X direction from the compressed region 524 and in the outer groove portion 23, and is not compressed. Since the compressed region 524 is compressed, thickness T1 of the non-compressed region 523 in the Z direction is greater than thickness T2 of the compressed region 524 in the Z direction.

Likewise, the elastic portion 53 includes a compressed region 534 and a non-compressed region 533. The compressed region 534 is compressed in the −Z direction and elastically deformed by the bead portion 44. The elastic restoring force of the compressed region 534 exerting between the compressed region 534 and the bead portion 44 ensures sealability between the frame 50 and the bead portion 44, which prevents the cathode gas from leaking from the outer groove portion 43 to the outside. The non-compressed region 533 is located in the +X direction from the compressed region 534 and in the outer groove portion 43, and is not compressed. Since the compressed region 534 is compressed, thickness T3 of the non-compressed region 533 in the Z direction is greater than thickness T4 of the compressed region 534 in the Z direction.

[Configuration of Comparative Example]

Figure 4B:
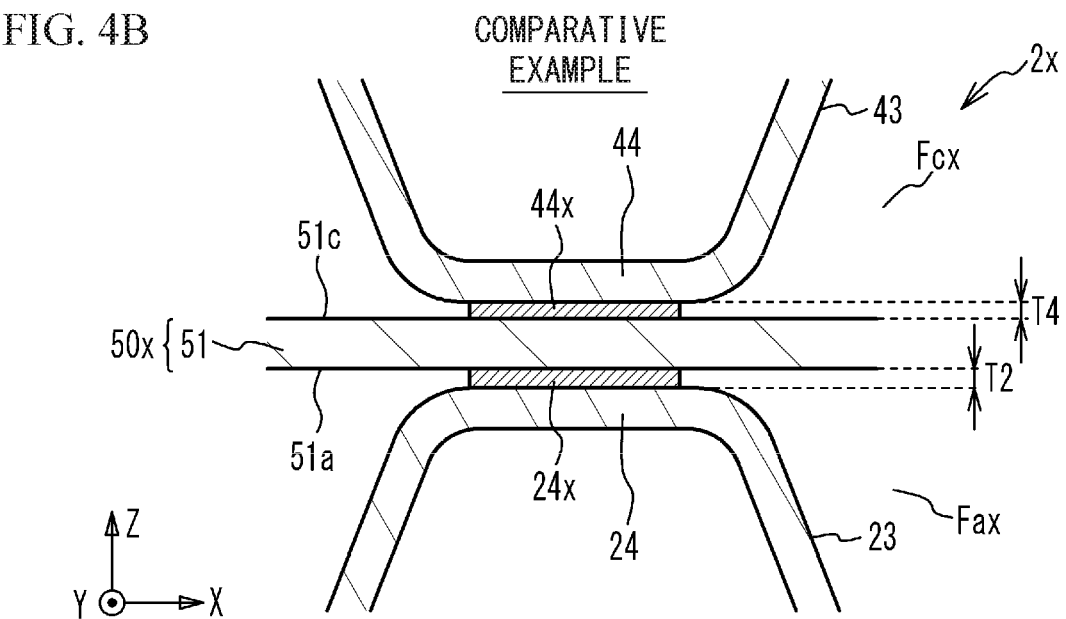
FIG. 4B is a partially enlarged cross-sectional view of a unit cell 2 of a comparative example.

FIG. 4B is a partially enlarged cross-sectional view of a unit cell 2x of the comparative example. In the comparative example, the same components are denoted by the same reference numerals, and redundant description is omitted. FIG. 4B corresponds to FIG. 4A. In a frame 50x of the unit cell 2x of the comparative example, the elastic portions 52 and 53 are not provided, but a gasket 24x is provided between the base member 51 and the bead portion 24, and a gasket 44x is provided between the base member 51 and the bead portion 44. The gaskets 24x and 44x are compressed and are elastically deformed by the bead portions 24 and 44, respectively. Each of the gaskets 24x and 44x is formed into a thin plate shape, and is made of rubber. The gaskets 24x and 44x are joined beforehand to a flat top portions of the outer surfaces of the bead portions 24 and 44, respectively. In the comparative example of FIG. 4B, the thicknesses T2 and T4 of the gaskets 24x and 44x in Z direction are illustrated to be the same as the thicknesses T2 and T4 of the compressed region 524 and the compressed region 534 according to the above-described embodiment, respectively. Additionally, in the comparative example, a flow path space Fax is surrounded by the outer groove portion 23, the frame 50x, the diffusion layer 16a, the catalyst layer 14a, and the electrolyte membrane 12, and a flow path space Fcx is surrounded by the outer groove portion 43, the frame 50x, the diffusion layer 16c, the catalyst layer 14c, and the electrolyte membrane 12.

[Detailed Configuration of Present Embodiment]

In the present embodiment, the non-compressed region 523 of the elastic portion 52 is located in the outer groove portion 23. However, in the comparative example, the gasket 24x does not extend into the outer groove portion 23. Therefore, a cross-sectional area, perpendicular to the Y direction in which the outer groove portion 23 extends, of the flow path space Fax in the comparative example (hereinafter, the cross-sectional area of the flow path space means an area of a cross section, perpendicular to the direction in which the outer groove portion extends, of the flow path space) is larger than the cross-sectional area of the flow path space Fa in the present embodiment.

Herein, for example, the cross-sectional area is large like the flow path space Fax, which increases a ratio of the flow rate of the anode gas flowing through the flow path space Fax to the total flow rate of the anode gas supplied to the unit cell 2x. This increases the flow rate of the anode gas flowing along the edge 18a of the diffusion layer 16a in the flow path space Fax, not supplied to the catalyst layer 14a, and not contributing to the power generation reaction. Further, this reduces the flow rate of the anode gas that may originally reach the catalyst layer 14a from the inside of the groove portions 21 through the diffusion layer 16a and may be used for the power generation reaction, and then the power generation efficiency might lower. In order to suppress such a reduction in power generation efficiency, it is considerable to increase the flow rate of the anode gas supplied to the fuel cell stack 1. This might degrade fuel consumption. Also, in a system in which a circulation pump recirculates the anode off gas to the fuel cell stack 1, this might increase power consumption of the circulation pump for an increase in circulation amount.

The cross-sectional area of the flow path space Fa is small in the present embodiment. This reduces the ratio of the flow rate of the anode gas flowing through the flow path space Fa to the total flow rate of the anode gas supplied to the unit cell 2, which ensures the flow rate of the anode gas used for the power generation reaction. Thus, the anode gas supplied to the unit cell 2 is efficiently used, so the power generation efficiency is improved, and the fuel consumption is also improved. Further, this reduces the power consumption in a case where a circulation pump recirculates the anode off gas to the fuel cell stack 1.

Likewise, for example, when the cross-sectional area is large like the flow path space Fcx, which increases the ratio of the flow rate of the cathode gas flowing through the flow path space Fcx to the total flow rate of the cathode gas supplied to the unit cell 2x. This might increase the flow rate of the cathode gas flowing between the inner surface of the outer groove portion 43 and the frame 50x in the flow path space Fcx, not reaching the catalyst layer 14c, and not contributing to the power generation reaction. Thereby, the power generation efficiency might lower. In order to suppress such a reduction in power generation efficiency, it is considerable to increase the flow rate of the cathode gas supplied to the fuel cell stack 1. This might increase the power consumption of the air compressor that supplies the cathode gas to the fuel cell stack 1. The cross-sectional area of the flow path space Fc in the present embodiment is small. This improves the power generation efficiency, and reduces the power consumption of the air compressor.

Figure 5A:
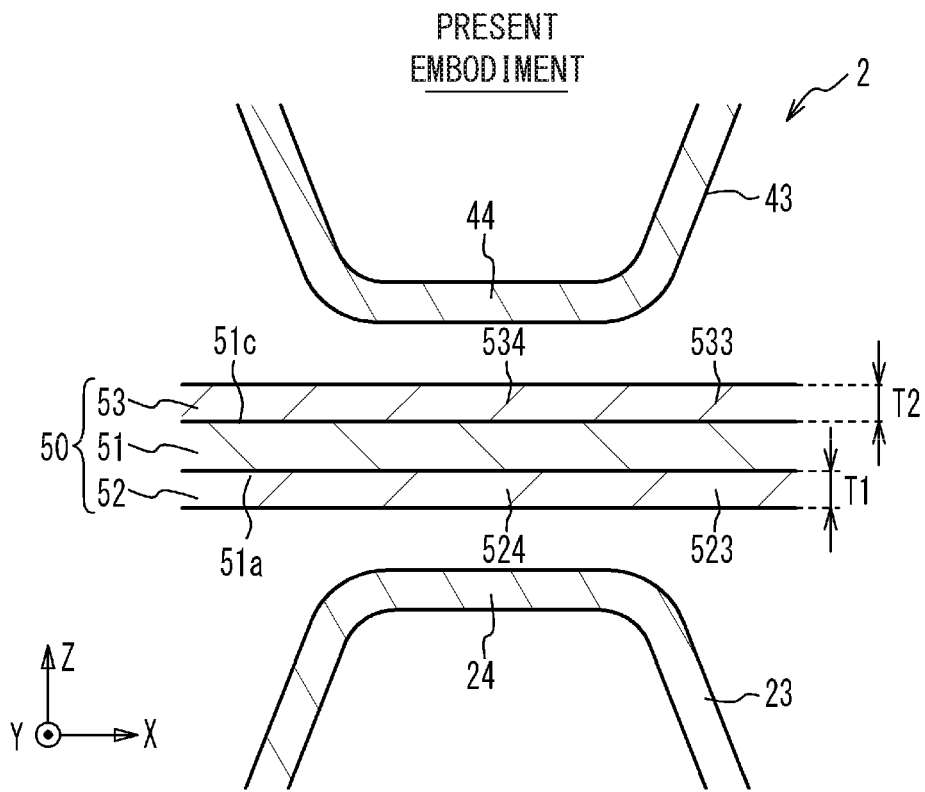
FIG. 5A is a partially enlarged cross-sectional view of the frame before being sandwiched between the separators.

FIG. 5A is a partially enlarged cross-sectional view of the frame 50 before being sandwiched between the separators 20 and 40. In addition, the elastic portions 52 and 53 are not compressed in a state before the frame 50 is sandwiched between the separators 20 and 40, but FIG. 5A illustrates the compressed region 524 and the compressed region 534 for convenience of description. In the state before the frame 50 is sandwiched between the separators 20 and 40, the compressed region 524 and the non-compressed region 523 have the same thickness T1. Likewise, the compressed region 534 and the non-compressed region 533 have the same thickness T2. The elastic portions 52 and 53 each has a uniform thickness, which facilitates manufacturing the frame 50 and reducing the manufacturing cost. Also, the thicknesses T1 and T2 may be set in light of the compression allowance.

The thickness T1 of the elastic portion 52 and the thickness T2 of the elastic portion 53 described above are, but not limited to, substantially the same, and one may be thicker than the other. For example, in a case of sufficiently reducing the power consumption of the air compressor that supplies the cathode gas to the fuel cell stack 1, the cathode-side elastic portion 53 may be made thicker than the anode-side elastic portion 52, and the cross-sectional area of the flow path space Fc may be as small as possible. On the other hand, in a case of sufficiently reducing the power consumption of the circulation pump that circulates the anode gas in the fuel cell stack 1, the elastic portion 52 may be made thicker than the elastic portion 53, and the cross-sectional area of the flow path space Fa may be as small as possible.

Further, the elastic portions 52 and 53 are formed entirely over the surfaces 51a and 51c of the base member 51, respectively. This ensures the durability and rigidity of the entire frame 50.

Herein, during operation of the fuel cell stack 1, the frame 50 is heated and thermally expanded due to a power generation reaction. In contrast, during non-operation of the fuel cell stack 1 under a low temperature environment, the frame 50 is cooled and thermally contracted. A large difference between the anode side surface and the cathode side surface of the frame 50 in thermal deformation amount might exert force on the frame 50 to be warped. In this case, even if the frame 50 adheres to the electrolyte membrane 12, the surface pressure received by the electrolyte membrane 12 from the frame 50 might be reduced depending on the adhesive force, and sealability between the frame 50 and the electrolyte membrane 12 might be reduced. In the present embodiment, the elastic portions 52 and 53 are formed on the surfaces 51a and 51c of the base member 51, respectively. This suppresses an increase in the difference between the anode side surface and the cathode side surface of the frame 50 in thermal deformation amount, as compared with a case where the elastic portion is provided only on one of the surfaces 51a and 51c. Thus, occurrence of the above mentioned problem is suppressed.

In the present embodiment, the thickness T1 of the non-compressed region 523 of the elastic portion 52 is thicker than the thickness T2 of the compressed region 524 in the state where the MEGA 10 and the frame 50 are sandwiched between the separators 20 and 40, as illustrated in FIG. 4A. However, this configuration is not limited. For example, the thickness T1 may be equal to or smaller than the thickness T2 in the sandwiched state. As long as the non-compressed region 523 is located in the outer groove portion 23, the cross-sectional area of the flow path space Fa in the present embodiment is reduced more than the flow path space Fax in the comparative example in which such a non-compressed region 523 does not exist, and the power generation efficiency is improved. Likewise, the thickness T3 of the non-compressed region 533 of the elastic portion 53 may be equal to or smaller than the thickness T4 of the compressed region 534.

In the present embodiment, the compressed region 524 and the non-compressed region 523 have the same thickness in the state before the frame 50 is sandwiched between the separators 20 and 40, but are not limited to this. For example, the thickness of the compressed region 524 may be greater than the thickness of the non-compressed region 523 in the state before the frame 50 is sandwiched between the separators 20 and 40. The same applies to the thicknesses of the compressed region 534 and the non-compressed region 533.

[First Variation]

Figure 5B:
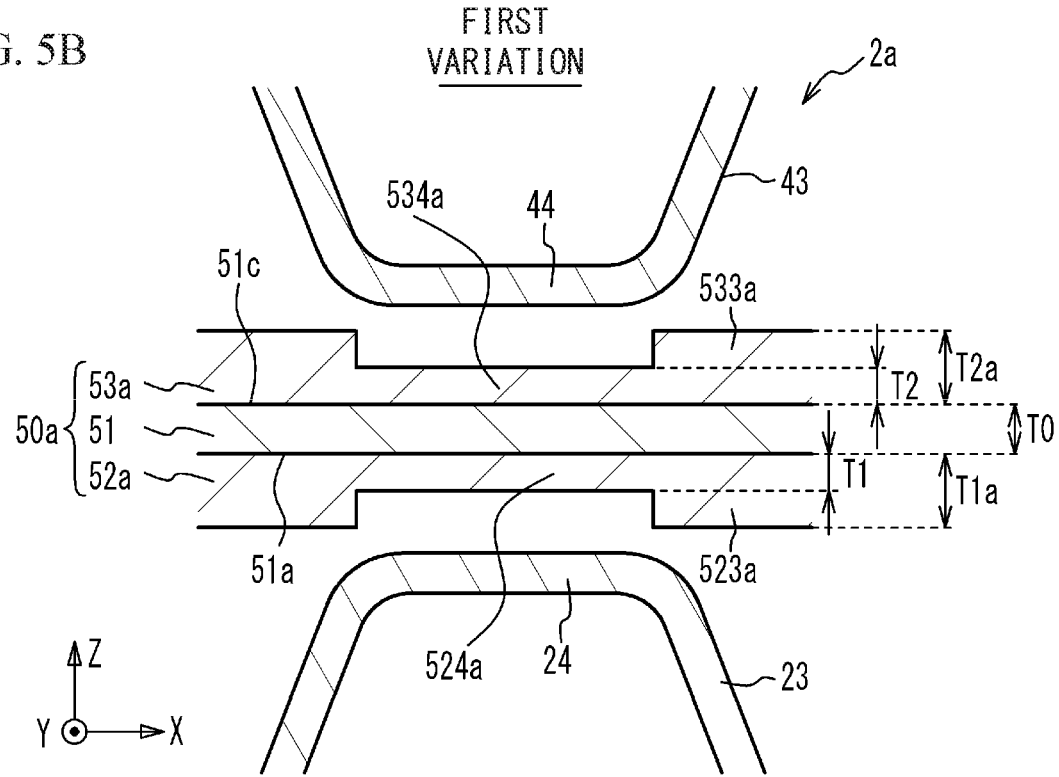
FIG. 5B is a partially enlarged cross-sectional view of a frame of a unit cell according to a first variation in a state before being sandwiched between the separators.

Next, variations will be described. In the variations, the same reference numerals are given to the same components as those of the above-described embodiment, and the variations will be described. FIG. 5B is a partially enlarged cross-sectional view of a frame 50a of a unit cell 2a according to a first variation in a state before being sandwiched between the separators 20 and 40. FIG. 5B corresponds to FIG. 5A. A thickness T1a of a non-compressed region 523a of an elastic portion 52a of the frame 50a is thicker than the thickness T1 of a compressed region 524a. Likewise, a thickness T2a of a non-compressed region 533a of an elastic portion 53a of the frame 50a is thicker than the thickness T2 of a compressed region 534a. Thus, the cross-sectional area of the flow path space described above is further reduced, and the power generation efficiency is further improved.

Herein, as for an elastic member such as a gasket, sealability is better when the thickness is smaller. In the first variation, the thickness T1 of the compressed region 524a before compression is thinner than the thickness T1a of the non-compressed region 523a, and the thickness T2 of the compressed region 534a before compression is thinner than and the thickness T2a of the non-compressed region 533a, which secures sealability.

Each of the thicknesses T1a and T2a is thicker than a thickness T0 of the base member 51, but is not limited thereto. Further, the non-compressed region 523a located in the outer groove portion 23 may be thickened as in this variation, and a region on the −X direction side from the compressed region 524a may have the same thickness as the compressed region 524a. Likewise, only the non-compressed region 533a located in the outer groove portion 43 may be thickened as described above, and a region on the −X direction side from the compressed region 534a may have the same thickness as the compressed region 534a.

[Second Variation]

Figure 6A:
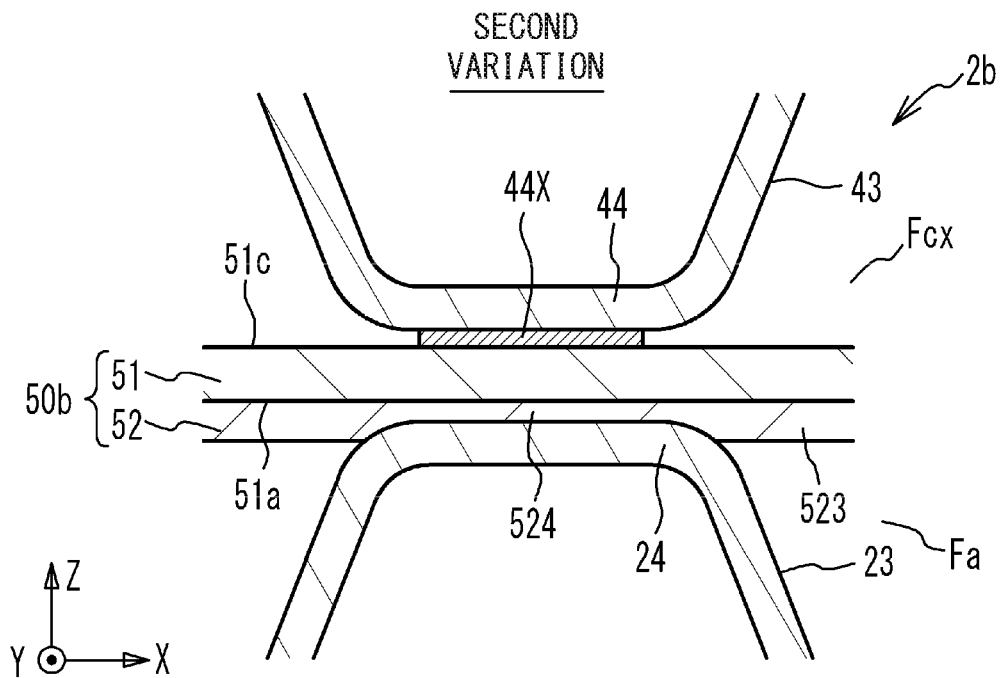
FIG. 6A is a partially enlarged cross-sectional view of a frame of a unit cell according to a second variation.

FIG. 6A is a partially enlarged cross-sectional view of a frame 50b of a unit cell 2b according to a second variation. FIG. 6A corresponds to FIG. 4A. The frame 50b includes the base member 51 and the elastic portion 52. The frame 50b is not provided with the elastic portion 53 described above. The gasket 44x described above is provided between the base member 51 and the bead portion 44. The gasket 44x is provided beforehand on a flat top portion of an outer surface of the bead portion 44. Such a frame 50b reduces the cross-sectional area of the flow path space Fa, which efficiently uses the anode gas for the power generation reaction. This improves the fuel efficiency. Further, since the flame 50b is not provided with the elastic portion 53, material cost is reduced, so the manufacturing cost of the flame 50b is reduced. In the second variation, the elastic portion 52 is an example of the first elastic portion, and the separator 20 is an example of the first separator. In the second variation, the elastic portion 52a of the first variation may be used instead of the elastic portion 52. In the second variation, the thickness of the non-compressed region may be equal to or less than the thickness of the compressed region in the sandwiched state.

[Third Variation]

Figure 6B:
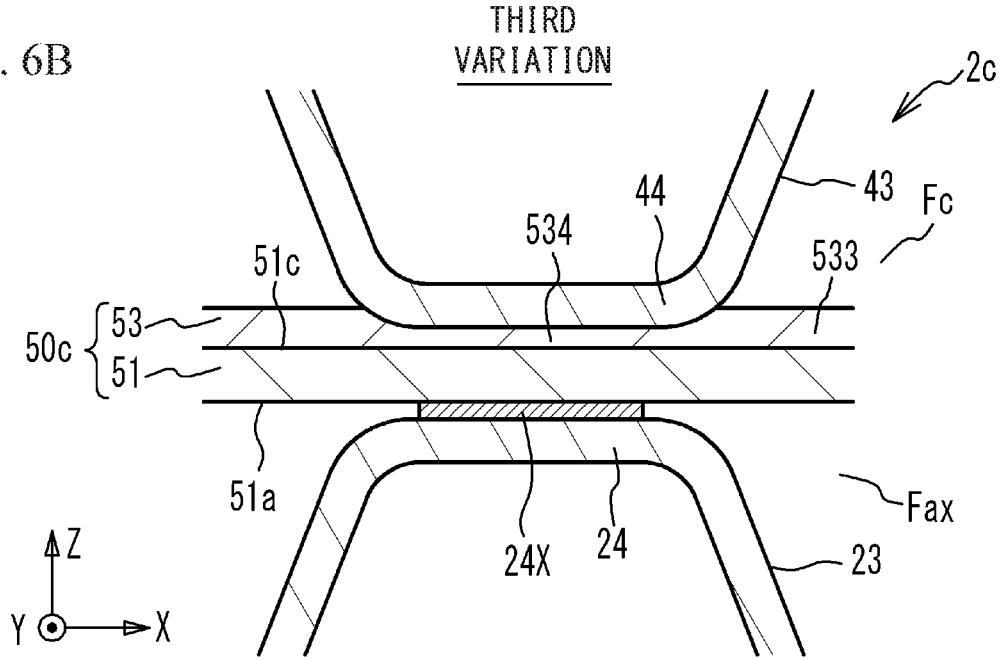
FIG. 6B is a partially enlarged cross-sectional view of a frame of a unit cell according to a third variation.

FIG. 6B is a partially enlarged cross-sectional view of a frame 50c of a unit cell 2c according to a third variation. FIG. 6B corresponds to FIG. 4A. The frame 50c includes the base member 51 and the elastic portion 53. The frame 50c is not provided with the elastic portion 52 described above. The gasket 24x described above is provided between the base member 51 and the bead portion 24. Such a frame 50c reduces the cross-sectional area of the flow path space Fc, which efficiently uses the cathode gas for the power generation reaction. This suppresses an increase in power consumption of the air compressor. Further, since the frame 50c is not provided with the elastic portion 52, material cost is reduced, so the manufacturing cost of the frame 50c is reduced. In the third variation, an inner peripheral portion of the surface 51a of the base member 51 is directly bonded to the outer peripheral portion of the electrolyte membrane 12 with an adhesive. In the third variation, the elastic portion 53 is an example of the first elastic portion, and is an example of the first separator of the separator 40. In the third variation, the elastic portion 53a of the first variation may be used instead of the elastic portion 53. In the third variation, the thickness of the non-compressed region may be equal to or less than the thickness of the compressed region in the sandwiched state.

[Fourth Variation]

Figure 7A:
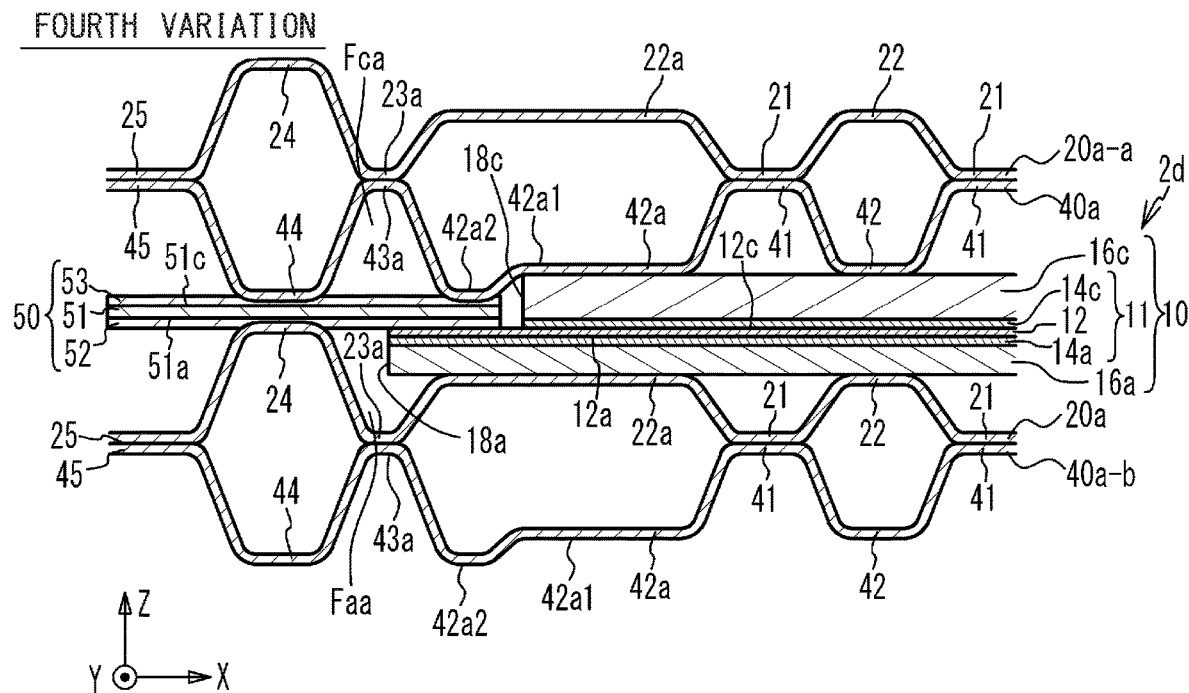
FIG. 7A is a partial cross-sectional view of a unit cell according to a fourth variation.

FIG. 7A is a partial cross-sectional view of a unit cell 2d according to a fourth variation. FIG. 7A corresponds to FIG. 3. In the fourth variation, separators 20a, 20a-a, 40a, and 40a-b are used instead of the separators 20, 20-a, 40, and 40-b described above. The separators 20a and 20a-a are the same member. The separators 40a and 40a-b are the same member. A rib portion 22a of the separator 20a has a rib width in the −X direction that extends to the vicinity of the edge 18a of the diffusion layer 16a from the groove portion 21 adjacent to the rib portion 22a. Specifically, the rib portion 22a extends to a region in which the frame 50, the electrolyte membrane 12, the catalyst layer 14a, and the diffusion layer 16a overlap one another.

A rib portion 42a of the separator 40a includes a contact portion 42a1 and a pressing portion 42a2. The contact portion 42a1 is in contact with the diffusion layer 16c. The pressing portion 42a2 is positioned on the −X direction side from the contact portion 42a1, and protrudes in the −Z direction with respect to the contact portion 42a1. The pressing portion 42a2 compresses the elastic portion 53 in a region of the frame 50 overlapping the catalyst layer 14a and the electrolyte membrane 12. Accordingly, the diffusion layer 16a, the catalyst layer 14a, the electrolyte membrane 12, and the frame 50 are sandwiched in the Z direction between the pressing portion 42a2 and the rib portion 22a. This ensures sealability between the frame 50 and the electrolyte membrane 12. This also ensures sealability between the frame 50 and the electrolyte membrane 12 without bonding the frame 50 with the electrolyte membrane 12. This eliminates the process of bonding the frame 50 with the electrolyte membrane 12 at the time of manufacture, so that the manufacturing process is simplified. In the fourth variation, the elastic portion 52 is an example of the first elastic portion, the elastic portion 53 is an example of the second elastic portion, the rib portion 22a is an example of a first rib portion, and the rib portion 42a is an example of a second rib portion.

Further, the pressing portion 42a2 compresses the elastic portion 53. This prevents, for example, a part of the cathode gas flowing in the diffusion layer 16c from entering an outer groove portion 43a from between the pressing portion 42a2 and the elastic portion 53. This efficiently uses the cathode gas flowing in the diffusion layer 16c, which improves the power generation efficiency.

Furthermore, like the above-described embodiment, the elastic portions 52 and 53 are respectively provided on the surfaces 51a and 51c of the base member 51 of the frame 50. This suppresses the frame 50 from being warped due to thermal deformation. This also ensures sealability between the frame 50 and the electrolyte membrane 12.

Further, like the case described above, the elastic portion 52 is not compressed in an outer groove portion 23a, and the elastic portion 53 is not compressed in the outer groove portion 43a. This reduces each cross-sectional area of flow path spaces Faa and Fca, which improves the power generation efficiency.

Further, since the width of the rib portion 22a is larger than that of the rib portion 22 in the present embodiment described above, the width of the outer groove portion 23a is smaller than that of the outer groove portion 23 in the present embodiment. Thus, the cross-sectional area of the flow path space Faa is smaller than that of the flow path space Fa in the present embodiment, which improves the power generation efficiency. Likewise, the width of the outer groove portion 43a is smaller than that of the outer groove portion 43 in the present embodiment. Thus, the cross-sectional area of the flow path space Fca is smaller than the cross-sectional area of the flow path space Fc in the present embodiment, which improves the power generation efficiency.

Further, the diffusion layer 16a, the MEA 11, and the diffusion layer 16c are sandwiched by the rib portions 22a and 42a each having a large width. This suitably supports the MEGA 10.

In the fourth variation, as depending on the thickness of the frame 50, the pressing portion 42a2 protrudes in the −Z direction with respect to the contact portion 42a1, but is not limited thereto. For example, the pressing portion 42a2 and the contact portion 42a1 may have the same protruding amount in the −Z direction. In order to compress the elastic portion 53 by the pressing portion 42a2 in this case, the thickness of the frame 50 excluding the compression allowance may be substantially the same as the total thickness of the catalyst layer 14c and the diffusion layer 16c. Further, the protruding amount of the pressing portion 42a2 in the −Z direction may be smaller than that of the contact portion 42a1. In order to compress the elastic portion 53 by the pressing portion 42a2 in this case, the thickness of the frame 50 excluding the compression allowance may be larger than the total thickness of the catalyst layer 14c and the diffusion layer 16c.

[Fifth Variation]

Figure 7B:
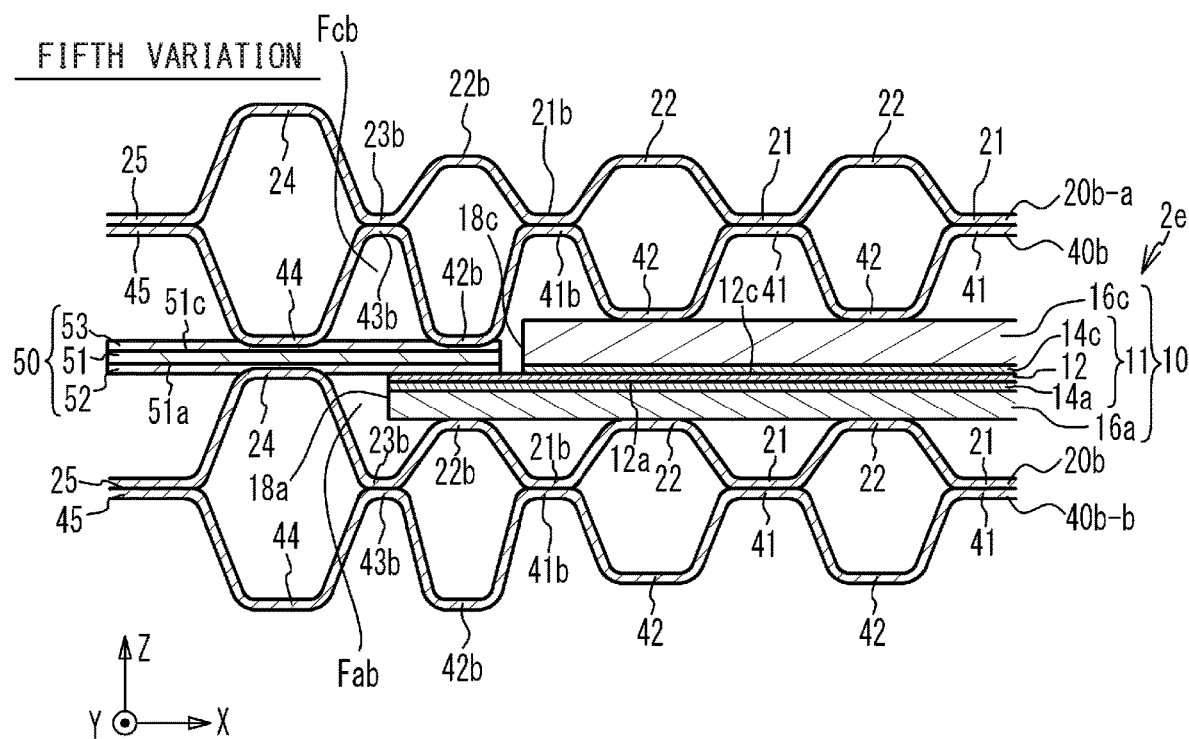
FIG. 7B is a partial cross-sectional view of a unit cell of a fifth variation.

FIG. 7B is a partial cross-sectional view of a unit cell 2e of a fifth variation. FIG. 7B corresponds to FIG. 3. In the fifth variation, separators 20b, 20b-a, 40b, and 40b-b are used instead of the separators 20, 20-a, 40, and 40-b described above. The separators 20b and 20b-a are the same member. The separators 40b and 40b-b are the same member.

A rib portion 22b is formed between the rib portion 22 and the bead portion 24 of the separator 20b. Specifically, the rib portion 22b is adjacent to the rib portion 22 through a groove portion 21b, and to the bead portion 24 through an outer groove portion 23b. The groove portion 21b is narrower than the groove portion 21. Likewise, a rib portion 42b is formed between the rib portion 42 and the bead portion 44 of the separator 40b. Specifically, the rib portion 42b is adjacent to the rib portion 42 through a groove portion 41b, and to the bead portion 44 through an outer groove portion 43b. The groove portion 41b is narrower than the groove portion 41.

The rib portion 22b is in contact with the diffusion layer 16a in a region in which the frame 50, the catalyst layer 14a, and the diffusion layer 16a overlap one another in the Z direction. Likewise, the rib portion 42b compresses the frame 50 in a region in which the frame 50, the catalyst layer 14a, and the diffusion layer 16a overlap one another in the Z direction. Accordingly, the diffusion layer 16a, the catalyst layer 14a, the electrolyte membrane 12, and the frame 50 are sandwiched between the rib portions 22b and 42b.

The rib portion 22b is narrower than the rib portion 22a according to the fourth variation described above. This prevents a portion of the rib portion 22b in contact with the diffusion layer 16a from bendingly protruding in the −Z direction due to the reaction force from the diffusion layer 16a. The rib portion 42b is narrower than the rib portion 42a according to the fourth variation described above. This also prevents a portion of the rib portion 42b in contact with the frame 50 from bendingly protruding in the +Z direction due to the reaction force from the frame 50. In this way, the rib portions 22b and 42b are not easily deformed with the reaction force from the diffusion layer 16a and the frame 50, respectively. Thus, the sandwiching force of the rib portions 22b and 42b is improved for sandwiching the diffusion layer 16a, the catalyst layer 14a, the electrolyte membrane 12, and the frame 50. This ensures sealalibity between the frame 50 and the electrolyte membrane 12, which eliminates the process of bonding the frame 50 with the electrolyte membrane 12 in manufacturing. In the fifth variation, the elastic portion 52 is an example of the first elastic portion, the elastic portion 53 is an example of the second elastic portion, the rib portion 22b is an example of the first rib portion, and the rib portion 42b is the second rib portion.

Further, the groove portion 41b is formed across the diffusion layer 16c and the support frame 50. For this reason, a part of the cathode gas flowing in the groove portion 41b reaches an end of the catalyst layer 14c through the diffusion layer 16c. This suppresses non-uniformity of the power generation of the MEA 11.

Like the fourth variation, the elastic portion 52 is not compressed in the outer groove portion 23b, and the elastic portion 53 is not compressed in the outer groove portion 43b. This reduces each cross-sectional area of flow path spaces Fab and Fcb, which improves the power generation efficiency. Further, since the rib portion 22b is provided between the rib portion 22 and the bead portion 24, the cross-sectional area of the flow path space Fab is smaller than that of the flow path space Fa in the present embodiment, which improves the power generation efficiency. Also, the cross-sectional area of the flow path space Fcb is smaller than that of the flow path space Fc in the present embodiment, which improves the power generation efficiency.

Additionally, in a case of using the separator 40a illustrated in FIG. 7A and the frame 50b illustrated in FIG. 6A, a gasket may be provided between the pressing portion 42a2 of the separator 40a and the base member 51 of the frame 50b. In a case of using the separator 40b illustrated in FIG. 7B and the frame 50b illustrated in FIG. 6A, a gasket may be provided between the rib portion 42b of the separator 40b and the base member 51 of the frame 50b.

[Others]

The present embodiment and the variations at least include, but not limited to, the elastic portion provided over a whole surface of the base member 51. The elastic portion may be partially provided. That is, the elastic portion only has to include the compressed region compressed by the bead portion, and the non-compressed region located in the outer groove portion and thicker than the thickness of the compressed region. For example, in the present embodiment illustrated in FIG. 4A, the elastic portion 52 may not be provided on the −X direction side from the compressed region 524, and the surface 51a of the base member 51 may be exposed. Alternately, the elastic portion 53 may not be provided on the −X direction side from the compressed region 534, and the surface 51c of the base member 51 may be exposed. The same applies to the first variation illustrated in FIG. 5A and the second and third variations. Further, the present embodiment and the variations include, but not limited to, the compressed region and the non-compression region of the elastic portion formed on one surface of the base member 51 and provided continuously. The compressed region and the non-compression region may be separately provided. In the fourth variation illustrated in FIG. 7A, the elastic portion 53 may be provided away from the pressing portion 42a2 such that the pressing portion 42a2 directly presses the surface 51c of the base member 51. The same applies to the fifth variation illustrated in FIG. 7B.

In the fourth and fifth variations, the frame 50 is not bonded to the electrolyte membrane 12, so the manufacturing process is simplified. However, the frame 50 may be bonded to the electrolyte membrane 12 by use of an auxiliary adhesive.

Although some embodiments of the present disclosure have been described in detail, the present disclosure is not limited to the specific embodiments but may be varied or changed within the scope of the present disclosure as claimed.

What is claimed is:

1. A fuel cell comprising:
   a membrane electrode gas diffusion layer assembly in which a membrane electrode assembly is sandwiched by a pair of gas diffusion layers;
   an insulating member formed into a frame shape, and being in contact with an outer peripheral portion of the membrane electrode gas diffusion layer assembly; and
   first and second separators sandwiching the membrane electrode gas diffusion layer assembly and the insulating member,
   wherein
   the insulating member includes:
      a base member formed into a frame shape; and
      a first elastic portion provided beforehand on a first surface of the base member facing the first separator, an elastic modulus of the first elastic portion being smaller than an elastic modulus of the base member,
   the first separator includes:
      first groove portions arranged side by side in a first direction, first reactant gas flowing along the first groove portions;
      a first outer groove portion located in the first direction from the first groove portions, the first reactant gas flowing along the first outer groove portion;
      a first bead portion adjacent to the first outer groove portion and located in the first direction from the first outer groove portion,
   the second separator includes a second bead portion, the insulating member being sandwiched between the first and second bead portions,
   the first elastic portion includes:
      a first compressed region compressed by the first bead portion and located between the first and second bead portions; and
      a first non-compressed region located in the first outer groove portion.

2. The fuel cell according to claim 1, wherein the first non-compressed region is thicker than the first compressed region in a state where the membrane electrode gas diffusion layer assembly and the insulating member are sandwiched between the first and second separators.

3. The fuel cell according to claim 1, wherein the first non-compressed region is equal to the first compressed region in thickness, before the membrane electrode gas diffusion layer assembly and the insulating member are sandwiched between the first and second separators.

4. The fuel cell according to claim 1, wherein the first non-compressed region is thicker than the first compressed region, before the membrane electrode gas diffusion layer assembly and the insulating member are sandwiched between the first and second separators.

5. The fuel cell according to claim 1, wherein the first elastic portion is entirely formed on the first surface of the base member.

6. The fuel cell according to claim 1, wherein the first non-compressed region is thicker than the base member.

7. The fuel cell according to claim 1, wherein a material of the first elastic portion includes at least one of a rubber and a thermoplastic elastomer.

8. The fuel cell according to claim 1, wherein
the insulating member includes a second elastic portion provided beforehand on a second surface, opposite to the first surface, of the base member, an elastic modulus of the second elastic portion being smaller than an elastic modulus of the base member,
the second separator includes:
  second groove portions arranged side by side in the first direction, second reactant gas flowing along the second groove portions;
  a second outer groove portion located in the first direction from the second groove portions, and adjacent to the second bead portion and located in a direction opposite to the first direction, the second reactant gas flowing along the second outer groove portion;
the second elastic portion includes:
  a second compressed region compressed by the second bead portion and located between the first and second bead portions; and
  a second non-compressed region located in the second outer groove portion.

9. The fuel cell according to claim 8, wherein the second non-compressed region is thicker than the second compressed region in a state where the membrane electrode gas diffusion layer assembly and the insulating member are sandwiched between the first and second separators.

10. The fuel cell according to claim 8, wherein the second non-compressed region is equal to the second compressed region in thickness, before the membrane electrode gas diffusion layer assembly and the insulating member are sandwiched between the first and second separators.

11. The fuel cell according to claim 8, wherein the second non-compressed region is thicker than the second compressed region, before the membrane electrode gas diffusion layer assembly and the insulating member are sandwiched between the first and second separators.

12. The fuel cell according to claim 8, wherein the second non-compressed region is thicker than the base member.

13. The fuel cell according to claim 8, wherein the second elastic portion is entirely formed on the second surface of the base member.

14. The fuel cell according to claim 8, wherein a material of the second elastic portion includes at least one of a rubber and a thermoplastic elastomer.

15. The fuel cell according to claim 1, wherein
the membrane electrode assembly includes:
  an electrolyte membrane;
  a first catalyst layer formed on a first surface of the electrolyte membrane in the first separator side; and
  a second catalyst layer formed on a second surface opposite to the first surface of the electrolyte membrane so as to expose an edge region of the second surface of the electrolyte membrane,
the pair of gas diffusion layers include:
  a first gas diffusion layer joined to the first catalyst layer; and
  a second gas diffusion layer joined to the second catalyst layer so as to expose the edge region,
the first separator includes
  a first rib portion adjacent to the first outer groove portion, located in a direction opposite to the first direction from the first outer groove portion, and in contact with the first gas diffusion layer, and
the second separator includes
  a second rib portion sandwiching the insulating member, the edge region of the electrolyte membrane, the first catalyst layer, and the first gas diffusion layer with the first rib portion.

16. The fuel cell according to claim 15, wherein the first elastic portion is in contact with the edge region, and is not joined to the edge region.

17. The fuel cell according to claim 15, wherein at least part of the first rib portion is in contact with the first gas diffusion layer, and sandwiches the membrane electrode assembly and the pair of gas diffusion layers with the second rib portion.

* * * * *